United States Patent Office 3,560,094
Patented Feb. 2, 1971

3,560,094
SHAFT POSITION ENCODER
Carlo Del Carlo, Utica, Mich., assignor, by mesne assignments, to Teeg Research Inc., Detroit, Mich., a corporation of Delaware
Filed July 13, 1965, Ser. No. 472,402
Int. Cl. G01r *21/40;* G02f *1/26*
U.S. Cl. 356—117                                   8 Claims

ABSTRACT OF THE DISCLOSURE

An optical shaft encoder utilizing a beam of polarized light which is modulated according to a predetermined frequency by a modulation signal. The modulated polarized light is passed through an analyzer mounted on the end of a shaft whose angular position is to be measured. The light emerging from the analyzer impinges upon a detector which provides an electrical signal at its output which is compared to the modulation signal. The phase shift between the modulation signal and the detected signal is proportional to the angle of rotation of the shaft.

---

The present invention relates to a shaft position encoder and more particularly to a precision angle measurement instrument. The need for precision angle measurement has long been recognized in many fields, especially in the area of celestial navigation. The demand for small instruments with great resolution, capable of operating in extreme environments, has outrun the potential of electro-mechanical devices. Optical disc-type encoders belong in the mechanical category, since their successful operation depends on the extent to which extremely close mechanical tolerances can be held in their manufacture. The problems involved, for example, in attempting to develop a disc device having a 21 bit resolution amount basically to attempting to improve the art of mechanical fabrication by several orders of magnitude. A satisfactory solution of the problem of manufacturing high precision and high sensitivity shaft encoders demands an entirely new approach rather than a limited attempt to refine the machinist's craft. The present invention is based on such a new approach involving, in essence, an interferometer employing polarized light. An instrument based on the principle of the invention is a compact, high resolution device having essentially no moving parts. The resolution of a shaft encoder, according to the present invention, is better than 23 bits. The small size and inherent ruggedness of such an instrument make it ideally suitable for virtually any industrial or military application.

An object of the invention, therefore, is to provide a shaft position encoder of high precision and high sensitivity. Another object of the invention is to provide a shaft position encoder having no moving parts, immune to gravity and acceleration, made of a few readily available components and capable of operating in extreme environments for long periods of time.

Figure 1:
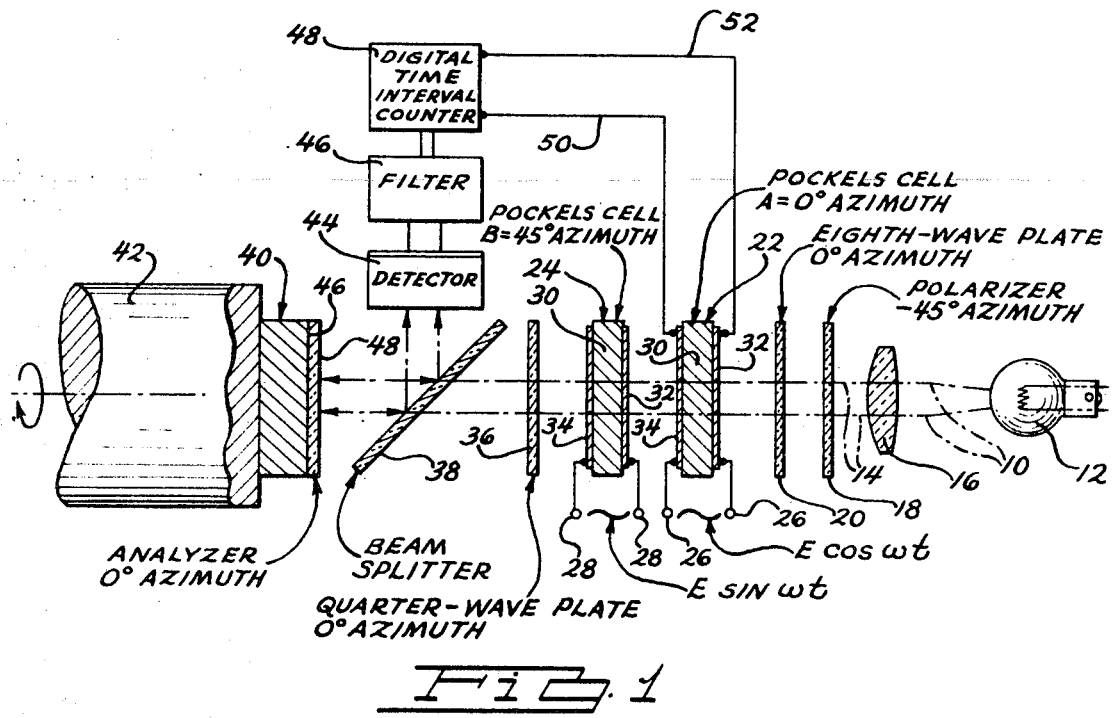
Figure 2:
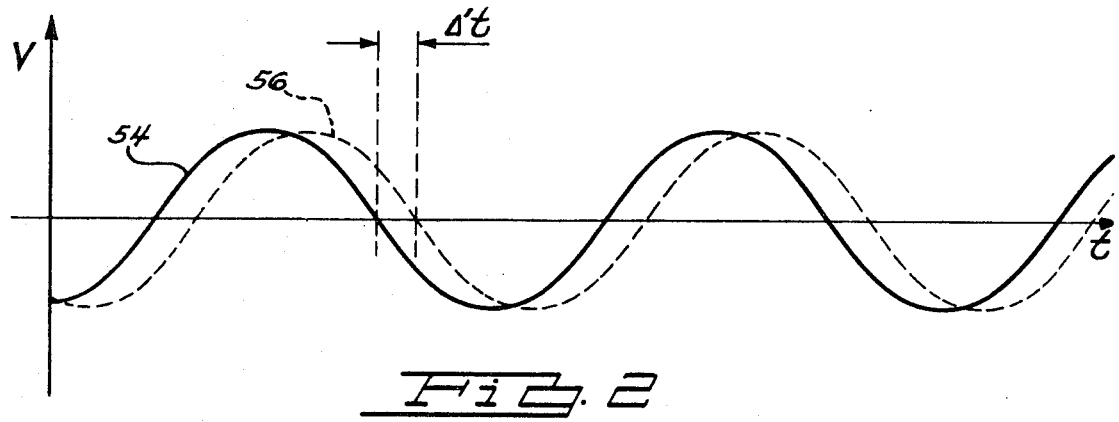

Other objects nd advantages of the invention will become apparent when the following specification is considered in connection with the attached drawings wherein:

FIG. 1 is a schematic representation of a shaft encoder according to the present invention; and
FIG. 2 is a graph useful in explaining the operation of the device of FIG. 1.

Referring now to the drawings and more particularly to FIG. 1 thereof which represents an example of a shaft encoder according to the invention, a beam of light 10 emitted by a light bulb 12 is concentrated into a beam of substantially parallel rays 14, by means of a lens 16. The beam of light 14 then passes through a polarizer 18, which may consist of a prism assembly or an ordinary polarizing filter. The beam of light emerging from the polarizer 18 passes through an eighth-wave plate 20, made of quartz, and providing a fixed retardation of the phase between the wave components of the beam of polarized light.

The beam of collimated polarized light emerging from the eighth-wave plate 20 enters a series of two Pockels cells 22 and 24 which are driven by sinusoidal voltages, applied to terminals 26 and 28, differing in phase by 90 degrees. Each individual Pockels cell consists typically of a crystal of potassium dihydrogen phosphate 30 whose faces are polished normal to the crystallographic Z-axis. When a voltage is applied to transparent electrodes 32 and 34 affixed to these faces, the normally uniaxial crystal 30 becomes birefringent and behaves as a variable retardation or modulation plate with retardation proportional to the applied voltage. (Billings B. H., Journal Optical Society of America 39 (1949)).

The elliptically polarized light emerging from the Pockels cell train passes through a quarter-wave plate 36 and, after passing through a beam splitter 38 is reflected from a mirror-analyzer transducer 40 attached to the end of the rotating shaft 42 and enters a photocell detector 44, such as a silicon photocell or the like, by way of reflection on the left hand face, as seen in the drawing, of the beam splitter 38. The spectral characteristics of the elements in the system combine to impart a mean wavelength to the working beam, which may be measured by an optical compensator such as the Babinet-Soleil. The absence of filters produces more usable light flux in the system.

The beam splitter 38 consists of a semitransparent mirror, and the mirror-analyzer transducer 40, attached to the rotating shaft 42, comprises a mirror portion 46 on the surface of which is attached the analyzer portion 48 which may generally consist of a polarizing filter or film.

The signal response of the encoder can be best described through application of the Mueller-Jones calculus which provides, by means of the product of characteristic matrices, an analytical description of the state of polarization of a light beam which has passed through a series of polarization-modifying optical components. Accordingly, the amplitude $y$ of the polarized light incident on the detector 44 is given by:

$$y = \overbrace{\begin{pmatrix} 00 \\ 01 \end{pmatrix}}^{9} \overbrace{\begin{pmatrix} \cos\theta & \sin\theta \\ -\sin\theta & \cos\theta \end{pmatrix}}^{8} \overbrace{\begin{pmatrix} 10 \\ 0j \end{pmatrix}}^{7} \overbrace{\frac{\sqrt{2}}{2}\begin{pmatrix} 1 & -1 \\ 1 & 1 \end{pmatrix}}^{6} \overbrace{\begin{pmatrix} 1 & 0 \\ 0 & \exp(j\delta) \end{pmatrix}}^{5}$$

$$\overbrace{\frac{\sqrt{2}}{2}\begin{pmatrix} 1 & 1 \\ -1 & 1 \end{pmatrix}}^{4} \overbrace{\begin{pmatrix} 1 & 0 \\ 0 & \exp(j\epsilon) \end{pmatrix}}^{3} \overbrace{\begin{pmatrix} 1 & 0 \\ 0 & \exp(j\pi/4) \end{pmatrix}}^{2} \overbrace{\frac{\sqrt{2}}{2}\begin{pmatrix} -1 \\ 1 \end{pmatrix}}^{1}$$

assuming a lossless system, and adopting the convention of measuring azimuth angles from an arbitrary external reference while looking against the direction of propagation of the beam. (Schurcliff, W. A., Polarized Light, Harvard University Press (1962), p. 109).

Reading the matrix product from right to left, the first matrix with constant coefficient describes a beam of linearly polarized light of unit amplitude with polarization azimuth at −45 degrees to the reference, due to the presence of polarizer 18.

The second matrix accounts for the action of the eighth-wave plate 20 with optic axis parallel to the reference.

The third matrix describes Pockels cell A, represented by numeral 22 in FIG. 1, which introduces a phase shift $\epsilon$ between the components of the polarized light parallel and perpendicular to the reference.

The fourth matrix with constant coefficient resolves the light emerging from Pockels cell 22 into components at +45 degrees to the reference, while the fifth matrix, describing Pockels cell B, represented by numeral 24 in FIG. 1, introduces a phase shift $\delta$ between these components.

The sixth matrix with constant coefficient resolves the light emerging from Pockels cell 24 into components parallel and perpendicular to the reference.

The seventh matrix takes into account the action of the quarter-wave plate 36 in introducing a 90 degree phase shift between the components resolved parallel and perpendicular to the reference.

The eighth matrix resolves the light emerging from the quarter-wave plate 36 into components at an angle of $+\theta$ from the reference, while the ninth matrix, selects the component corresponding to the reference in the $\theta$-rotated system, $\theta$ being the angular rotation of the analyzer. The eighth and ninth matrices consequently refer to the effect of the analyzer 48.

Expanding the matrix product results in:

$$y = \sqrt{\frac{2}{4}} \, (\sin \theta \, [1 + \exp(j\delta)] - \sin \theta \, \exp(j\epsilon) \, \exp(j\pi/4)$$
$$[1 - \exp(j\delta)] - j \cos \theta \, [1 - \exp(j\delta)]$$
$$+ j \cos \theta \, \exp(j\epsilon) \, \exp(j\pi/4)[1 + \exp(j\delta)])$$

The product of $y$ with its complex conjugate $y^*$ gives an expression for the light flux incident on the detector 44. Hence:

$$yy^* = \frac{1}{4} \, (2 - \sqrt{2} \sin \delta \cos 2\theta \, (\sin \epsilon + \cos \epsilon)$$
$$- \sqrt{2} \cos \delta \sin 2\theta \, (\sin \epsilon + \cos \epsilon))$$

Applying sinusoidal voltages across the Pockels cells 22 and 24 results in a corresponding modulation of the induced phase shifts according to the relations $$\delta = kE \sin \omega t$$
$$\epsilon = kE \cos \omega t$$

where E is the magnitude of the applied voltage and $k$ is a constant. If E is made small enough so that $\sin \delta = \delta$, and $\cos \delta = 1 - \delta^2/2$, and similarly for $\sin \epsilon$ and $\cos \epsilon$, $$yy^* = \frac{1}{8} \, (4 - \sqrt{2} \, (2 + k^2E^2) \sin 2\theta - 2\sqrt{2} \, kE \sin (\omega t$$
$$+ 2\theta) - k^2E^2 \sin 2\omega t \cos 2\theta)$$

The output of the detector 44, then, consists of DC term, an AC term having the same frequency as the Pockels cell driving voltages but shifted in phase by an angular amount twice the angular rotation of shaft 42, and a small AC term having twice the driving frequency with amplitude dependent on shaft rotation. A blocking and filtering circuit 46 passes only the useful working AC signal which is of the form:

$$V = k' \sin (\omega t + 2\theta) \quad (1)$$

where $f = \omega/2\pi$ is the driving frequency, $\theta$ the angular rotation of the shaft, and $k'$ a constant.

The useful output working signal is applied to a digital time interval counter 48 from the output of the filter 46, and the driving signal, which is the same as one of the sinusoidal signals applied to one of the Pockels cells, is also fed into the counter 48, as schematically represented in FIG. 1 by lines 50 and 52 connecting electrodes 32 and 34 of Pockels cell 22 to the counter 48. Consequently, the driving and output signals are used to actuate the digital time interval counter 48, and the time interval corresponding to the shift in phase becomes a linear function of the extent of shaft rotation.

Equation 1 states that a shaft rotation of 180 degrees generates a 360 degree phase shift in the output signal. Since there are $6.48 \times 10^5$ arc seconds per 180 degrees, the time interval $\Delta t$ corresponding to a rotation of one arc second of shaft 42 is:

$$\Delta t = 1.54 \times 10^{-6} f^{-1} \quad (2)$$

where $f$ is the driving frequency.

Commercial interval counters currently available are capable of resolving time intervals of $1 \times 10^{-9}$ seconds with an accuracy of $\pm 5 \times 10^{-10}$ seconds. As an example of such a counter is the Model 793 Digital Time Interval Counter manufactured by Eldorado Electronics Company of Concord, Calif.

For a desired device accuracy of 0.1 arc second, individual readings should be accurate to, say, 0.05 arc second. Using the established value of $5 \times 10^{-10}$ for $\Delta t$, the driving frequency required is:

$$f = 1.54 \times 10^{-6} \times (5 \times 10^{-10})^{-1} \times (.05) \text{ c.p.s.} = 154 \text{ c.p.s.}$$

The counter 48 can display a reading once per cycle; consequently it generates 154 readings of shaft position per second, each with an accuracy of .05 arc second.

In order to provide $10^6$ to $10^7$ readings per second a computer, not shown, external to the counter may be used to interpolate between successive readings, making use of the readily available, accurate rate information. The maximum error brought about by interpolation is not computer-limited. It depends only on the extent to which acceleration takes place during the 1/154 second interval under consideration, and it is to be noted that the interpolative errors are not cumulative.

Referring now to FIG. 2, there is shown a diagram representing substantially the driving voltage signal 54 applied simultaneously to both Pockels cell 22 and digital time interval counter 48, and the resultant useful working voltage signal 56 read by the detector 44 and applied through filter 46 to the counter 48, both curves being shown at substantially the same scale. It can be seen that the signal 56 is out of phase from the driving signal 54 by a time interval $\Delta' t$, this shift in phase $\Delta' t$ being a linear function of the extent of rotation of shaft 42 as hereinbefore explained. The counter 48 thus displays a reading proportional to time interval $\Delta' t$, such reading being representative of the shaft position, with an accuracy of .05 arc second as previously explained.

Referring again to FIG. 1, it is to be noted that the beam splitter 38 and the mirror 40 may be omitted in applications where the detector 44 can be placed within the shaft 42, or proximate the other end of the shaft with an appropriate aperture through the longitudinal axis of the shaft to afford a path for the beam of light 14. It will also be evident to those skilled in the art that the detector 44 may be any optical-electrical transducer and that the digital time interval counter 48 may be replaced by an analog display.

It is important that certain unique aspects of an encoder according to the invention be emphasized, such as its freedom from mechanical coupling. True optical coupling is maintained between the encoder head and the rotating shaft 42. The shaft carries an optical transducer 40 which may be made as small as 4 millimeters in diameter by 1.7 millimeters thick with a weight of approximately 50 milligrams. This weight constitutes the only mechanical load imposed on the rotating shaft by the encoder head, and, as mentioned above, by eliminating the beam splitter 38 and the mirror 46 by placing the detector 44 proximate the other end of the shaft, this weight could still be further reduced.

Furthermore, since no bearings whatsoever are incorporated in the device, starting and running torques are nil. This bearing-free design permits the easy adaptation of the encoder head to existing equipment where access to the end of a rotating shaft is readily available. The shaft may, if desired, be located some distance from the encoder.

It should also be emphasized that readout is sensitive only to angular rotations of the shaft 42. Transducer motions generated by shaft end play and runout are ignored.

The characteristics of an interferometric shaft position encoder according to the present invention may be summarized as follows.

Accuracy: 0.1 arc second at all angles. Independent of prior rotational history.
Resolution: 0.1 arc second.
Power input: 30 watts.
Slew rate: Unlimited.
Starting torque: None.
Running torque: None.
Type readout: 1-2-4-8 BCD; DC levels "0"=(−) 0.5 volt nominal; "1"=(−) 5.0 volts nominal.
Encoder weight and volume: Weight 1½ ounces, volume approximately one cubic inch, exclusive of electrical leads.
Electronics weight and volume: Weight one pound, volume 216 cubic inches.
Encoder life: Approximately 20 years based on average incandescent lamp life, longer for other sources.
Zero reference: Stable, internal reference is provided in the form of an abrupt 0 to 360 degree phase shift as the shaft moves across the zero or 180 degree position.
Bearing type: No bearings.
Bearing life: Does not apply.
Working temperature range: −40 to +65° C.
Absolute measurement: 360° operation.

It is obvious that many omissions and substitutions are possible without departing from the spirit and scope of the invention and that the invention is not to be restricted to the specific details herein described and illustrated, as the principles of the invention could be incorporated in many varied structural embodiments, and the scope of the present invention is to be limited only by the following claims.

What is claimed is:

1. An optical shaft position encoder comprising: means for producing a beam of light and for projecting said beam of light along a predetermined axis; means aligned with said axis for polarizing said beam of light; first means aligned with said axis for causing a predetermined phase retardation between the wave components of said beam of polarized light; first Pockels cell means aligned with said axis for modulating said phase retardation at a given frequency with respect to a first azimuth; second Pockels cell means aligned with said axis for modulating said phase retardation at said given frequency, with respect to a second azimuth; second means aligned with said axis for further causing a second predetermined phase retardation between the wave components of said beam of polarized light; means aligned with said axis for analyzing said beam of polarized light, said last mentioned means being coupled to be rotated in unison with the shaft, a detector and digital time interval counting means coupled to said detector for deriving from said light beam passed by said analyzing means a signal representative of the angular position of the shaft by comparing the signal emerging form said detector means with a signal driving one of the Pockels cell means for modulating said phase retardation.

2. An optical shaft position encoder comprising: a source of light, a lens for concentrating the light emitted by said source to a substantially parallel beam of light having a predetermined axis and path, a polarizer in said path for polarizing said light, an eighth-wave plate in said path for causing a predetermined phase retardation between the wave components of said polarized light, a first Pockels cell in said path having a drive voltage signal of the form E cos $\omega t$ applied thereacross, a second Pockels cell in said path having a drive voltage signal of the form E sin $\omega t$ applied thereacross, said first and second Pockels cells causing a modulaiton of said phase retardation in opposite azimuths, a quarter-wave plate in said path for further causing a predetermined phase retardation between the wave components of said beam of polarized light, a semi-transparent beam splitter in said path disposed at an angle to the axis of said beam of polarized light and adapted to allow said light to be propagated therethrough, an analyzer mounted in said path on one end of a rotating shaft whose angular position is to be determined, a mirror placed behind said analyzer for reflecting said beam of light back through said analyzer otward said semi-transparent beam splitter whereby said beam of light is reflected at an angle to the original axis thereof, a detector adapted to be impinged upon by said beam of light and to supply at its output an electrical signal in function of the intensity of the light impinging thereupon, electrical filter means electrically connected to the output of said detector and adapted to pass only a first electric voltage signal dependent from the variation of intensity of the light impinging upon said detector, and a digital time interval counter electrically connected to said electrical filter means and adapted to compare said first voltage signal passing through said electrical filter means with one of the drive voltage signals applied to said Pockels cells whereby the difference in phase between said first and second voltage signals is representative of the angular position of the shaft.

3. An optical shaft position encoder comprising: means for producing a substantially parallel beam of light having a predetermined axis and path, a polarizer in said path for polarizing said light, an eighth-wave plate in said path for causing a predetermined phase retardation between the wave components of said polarized light, a first Pockels cell in said path having a drive voltage signal of the form E cos $\omega t$ applied thereacross, a second Pockels cell in said path having a drive voltage signal of the form E sin $\omega t$ applied thereacross, said first and second Pockels cells causing a modulation of said phase retardation, a quarter-wave plate in said path for further causing another predetermined phase retardation between the wave components of said polarized light, a semi-transparent beam splitter disposed at an angle to the axis of said beam of polarized light and adapted to allow said light to be propagated therethrough, an analyzer mounted in said path on one end of a rotating shaft whose angular position is to be determined and a mirror placed behind said analyzer for reflecting said light back through said analyzer toward said semi-transparent beam splitter whereby said beam of light is reflected at an angle to the original axis thereof, a detector adapted to be impinged upon by said beam of light and to supply at its output an electrical signal in function of the intensity of the light impinging thereupon, electrical filter means electrically connected to the output of said detector and adapted to pass only a first electric voltage signal dependent from the variation of intensity of the light impinging upon said detector, and a digital time interval counter electrically connected to said electrical filter means and adapted to compare said first voltage signal passing through said electrical filter means with one of the drive voltage signals applied to said Pockels cells whereby the difference in phase between said first and second voltage signals is representative of the angular position of the shaft.

4. An optical shaft position encoder comprising: means for producing a substantially parallel beam of polarized light along a predetermined path and a plurality of elements in the path of said beam comprising an eighth-wave plate for causing a predetermined phase retardation between the wave components of said polarized light, a first Pockels cell having an AC drive voltage signal applied thereacross, a second Pockels cell having an AC drive voltage signal applied thereacross of same frequency and of a different phase relatively to said AC drive voltage signal applied across said first Pockels cell, said first and second Pockels cells causing a modulation of said phase retardation, a quarter-wave plate for further causing another predetermined phase retardation between the wave components of said polarized light, an analyzer mounted on one end of a rotating shaft whose angular position is to be determined, a mirror placed behind said analyzer for reflecting said light back through said analyzer, means for reflecting said beam of light at an angle to the original axis thereof, and detector means adapted to supply at its output a signal in function of the intensity of the light impinging thereupon; filter means at the output of said detector means adapted to pass only a first signal dependent from the variation of intensity of the light impinging upon said detector means; and means adapted to compare said first signal passing through said filter means with a second signal corresponding to one of the AC drive voltage signals applied to said Pockels cells whereby the difference in phase between said first and second signals is representative of the angular position of the shaft.

5. An optical shaft encoder comprising: means for producing a substantially parallel beam of polarized light having a predetermined path; a first plate in said path causing a phase retardation between the wave components of said polarized light; a first and second Pockels cells in said path for causing a modulation of said phase retardation; a second plate in said path causing further phase retardations between said wave components; an analyzer in said path mounted on one end of a rotating shaft whose angular position is to be determined; detector means in said path for supplying a first signal as a function of the intensity of the light impinging thereupon; and means coupled to said detector means to compare said first signal with a second signal in phase with a signal causing the modulation of said phase retardation between the wave components of said polarized light when passing through the Pockels cells, whereby the difference in phase between said first and second signals is representative of the angular position of the shaft.

6. An optical shaft encoder comprising: means for producing a substantially parallel beam of polarized light having a predetermined path; a first and second Pockels cells in said path for causing a modulation of said polarized light; an analyzer in said path mounted on one end of a rotating shaft whose angular position is to be determined; detector means in said path adapted to supply a first signal as a function of the intensity of the light impinging thereupon; and means coupled to said detector means for comparing said first signal with a second signal in phase with a signal causing the modulation of said phase retardation between the wave components of said polarized light when passing through the Pockels cells, whereby the difference in phase between said first and second signals is representative of the angular position of the shaft.

7. An optical shaft position encoder comprising: means for producing a substantially parallel beam of polarized light along a predetermined path and a plurality of elements in the path of said beam comprising: a first Pockels cell having an AC drive voltage signal of a predetermined frequency applied thereacross, a second Pockels cell having an AC drive voltage signal applied thereacross of same frequency and of different phase relatively to said AC drive voltage signal applied across said first Pockels cell, said first and second Pockels cells causing a modulation of said beam, an analyzer mounted on one end of a rotating shaft whose angular position is to be determined, a mirror placed behind said analyzer for reflecting said beam back through said analyzer, means for reflecting said beam at an angle to the original axis thereof and detector means for supplying at its output a signal as a function of the intensity of the light impinging thereupon; filter means at the output of said detector means for passing only a first signal dependent from the variation of intensity of the light impinging upon said detector means; and means to compare said first signal passing through said filter means with a second signal corresponding to one of the AC drive voltage signals applied to said Pockels cells whereby the difference in phase between said first and second signals is representative of the angular position of the shaft.

8. An optical shaft position encoder comprising: means for producing a substantially parallel beam of polarized light along a predetermined path and a plurality of elements in the path of said beam comprising: a first Pockels cell having an AC drive voltage signal applied thereacross, a second Pockels cell having an AC drive voltage signal applied thereacross of same frequency and of different phase relatively to said AC drive voltage signal applied across said first Pockels cell, said first and second Pockels cells causing a modulation of said beam, a detector supplying at its output a signal as a function of the intensity of the light impinging thereupon and means for impinging said beam emering from said analyzer upon said detector; filter means at the output of said detector for passing only a first signal dependent upon the variation of intensity of the light impinging upon said detector means; and means to compare said first signal passing through said filter means with a second signal corresponding to one of the AC drive voltage signals applied to said Pockels cells whereby the difference in phase between said first and second signals is representative of the angular position of the shaft.

References Cited

UNITED STATES PATENTS

| | | | |
|---|---|---|---|
| 2,936,380 | 5/1960 | Anderson | 250—225 |
| 2,998,746 | 9/1961 | Gievers | 88—14(EG) |
| 3,360,655 | 12/1967 | McKeown | 250—225 |

OTHER REFERENCES

King et al., Sensitive Method for the Measurements of Small Rotations, Jour. Sci. Inst., vol. 36, December 1959, pp. 507–509.

Meltzer, R. J., Magneto-Optic Positioning, IEEE Transactions on Industrial Electronics, vol. 1E10, No. 1, May 1963, pp. 46–56.

Seliger, V. W., Das Multiprismat—ein nevartiges optisch—elektronisches positioner System. Optk., vol. 21, No. 10, October 1964, pp. 546–550.

RONALD L. WIBERT, Primary Examiner

T. MOHR, Assistant Examiner

U.S. Cl. X.R.

350—150

TRI-107-A
PO-1050
(5/69)

UNITED STATES PATENT OFFICE
CERTIFICATE OF CORRECTION

Patent No. 3,560,094      Dated February 2, 1971

Inventor(s) Carlo DelCarlo

It is certified that error appears in the above-identified patent and that said Letters Patent are hereby corrected as shown below:

IN THE SPECIFICATION

Column 1, line 70, correct the spelling of "and"

Column 2, in the formula between lines 55 and 65, replace the expression "$\sqrt{\frac{2}{2}}$" by -- $\frac{\sqrt{2}}{2}$ -- (three occurr Column 3, in the formula between lines 30 and 36, replace the expression "$\sqrt{\frac{2}{4}}$" by -- $\frac{\sqrt{2}}{4}$ --

IN THE CLAIMS

Column 5, line 66, correct the spelling of "from"

Column 6, line 5, correct the spelling of "modulati( line 16, correct the spelling of "toward"

Column 8, line 32, correct the spelling of "emergin(

Signed and sealed this 8th day of June 1971.

(SEAL)
Attest:

EDWARD M. FLETCHER, JR.      WILLIAM E. SCHUYLER, JR.
Attesting Officer      Commissioner of Patents